US012770633B2

(12) United States Patent
Humphrey et al.

(10) Patent No.: US 12,770,633 B2
(45) Date of Patent: Oct. 20, 2026

(54) DISTRIBUTABLE AI VOICE UPSCALING

(71) Applicant: Lenovo Enterprise Solutions (Singapore) Pte. Ltd., New Tech Park (SG)

(72) Inventors: Grason Humphrey, Raleigh, NC (US); Milton Cobo, Raleigh, NC (US); Michael DeCesaris, Carrboro, NC (US); Eric Li, Chapel Hill, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 261 days.

(21) Appl. No.: 18/619,740

(22) Filed: Mar. 28, 2024

(65) Prior Publication Data

US 2025/0308542 A1 Oct. 2, 2025

(51) Int. Cl.
*G10L 21/007* (2013.01)
*G10L 15/07* (2013.01)

(52) U.S. Cl.
CPC ............ *G10L 21/007* (2013.01); *G10L 15/07* (2013.01)

(58) Field of Classification Search
CPC .............................. G10L 21/007; G10L 15/07
USPC .......................................................... 704/210
See application file for complete search history.

(56) References Cited

U.S. PATENT DOCUMENTS

| | | | | |
|---|---|---|---|---|
| 6,754,265 | B1 * | 6/2004 | Lindemann | G10L 19/00 375/240 |
| 6,801,886 | B1 * | 10/2004 | Pai | G10L 25/69 704/E19.002 |
| 10,623,554 | B1 * | 4/2020 | Pawar | H04M 1/72484 |
| 10,965,806 | B1 * | 3/2021 | Haggerty | G06N 3/0499 |
| 11,393,471 | B1 * | 7/2022 | Sanborn de Asis | G06F 3/167 |
| 11,605,388 | B1 * | 3/2023 | Gupta | A63F 13/215 |
| 12,223,973 | B1 * | 2/2025 | Sima | G06N 20/00 |
| 2009/0089063 | A1 * | 4/2009 | Meng | G10L 21/00 704/E21.001 |
| 2011/0046957 | A1 * | 2/2011 | Hertz | G10L 13/06 704/266 |
| 2014/0088968 | A1 * | 3/2014 | Chen | G10L 15/04 704/254 |

(Continued)

OTHER PUBLICATIONS

Benj Edwards, "AI language models can exceed PNG and FLAC in lossless compress, says study," https://arstechnica.com/information-technology/2023/09/ai-language-models-can-exceed-png-and-flac-in-lossless-compression-says-study, Sep. 28, 2023.

(Continued)

*Primary Examiner* — Thuykhanh Le
(74) *Attorney, Agent, or Firm* — Kunzler Needham & Hilton; Bruce R. Needham

(57) ABSTRACT

A method for distributable upscaling of audio signals includes receiving, over a communication channel by an electronic device of a first user, a low quality voice communication from a second user. The method includes accessing an artificial intelligence ("AI") voice upscaling model of the second user. The AI voice upscaling model is trained on a voice of the second user. The method includes using the AI voice upscaling model to improve the quality of the low quality voice communication to create a higher quality voice communication of the second user. The method includes transmitting the higher quality voice communication to a speaker connected to the electronic device of the first user.

18 Claims, 8 Drawing Sheets

(56) References Cited

U.S. PATENT DOCUMENTS

| | | | | |
|---|---|---|---|---|
| 2018/0358003 | A1* | 12/2018 | Calle | G10L 15/063 |
| 2019/0341041 | A1* | 11/2019 | Xie | G10L 17/04 |
| 2020/0051565 | A1* | 2/2020 | Singh | G10L 15/22 |
| 2020/0053408 | A1* | 2/2020 | Park | G06T 3/4007 |
| 2020/0058289 | A1* | 2/2020 | Gabryjelski | G06F 40/58 |
| 2020/0194019 | A1* | 6/2020 | Kostic | G10L 21/0208 |
| 2020/0312302 | A1* | 10/2020 | Lin | G10L 15/063 |
| 2020/0372900 | A1* | 11/2020 | Bell | G10L 25/60 |
| 2020/0374647 | A1* | 11/2020 | Cappello | G06V 40/171 |
| 2021/0056955 | A1* | 2/2021 | Doi | G10L 21/003 |
| 2021/0092462 | A1* | 3/2021 | Cox | H04N 21/23418 |
| 2021/0134269 | A1* | 5/2021 | Min | G10L 15/16 |
| 2021/0142782 | A1* | 5/2021 | Wolf | G10L 13/047 |
| 2021/0227338 | A1* | 7/2021 | Abdallah Abdelrehim Abokela | H04R 25/507 |
| 2021/0264938 | A1* | 8/2021 | Yao | G10L 25/60 |
| 2021/0352347 | A1* | 11/2021 | Arora | G06N 3/045 |
| 2022/0013133 | A1* | 1/2022 | Huang | G10L 15/02 |
| 2022/0108177 | A1* | 4/2022 | Samek | G06N 3/08 |
| 2022/0172707 | A1* | 6/2022 | Wang | G10L 15/02 |
| 2022/0210213 | A1* | 6/2022 | Petrovic | H04N 21/25825 |
| 2022/0301107 | A1* | 9/2022 | Zeng | B60S 1/56 |
| 2022/0358904 | A1* | 11/2022 | Mandel | G10L 13/047 |
| 2023/0016637 | A1* | 1/2023 | Schmidt | G06N 3/045 |
| 2023/0037892 | A1* | 2/2023 | Joo | G10L 13/047 |
| 2023/0298567 | A1* | 9/2023 | Tan | G10L 13/00 704/243 |
| 2024/0096343 | A1* | 3/2024 | Wei | G10L 21/0308 |
| 2024/0135945 | A1* | 4/2024 | Takahashi | G10L 21/007 |
| 2024/0161765 | A1* | 5/2024 | Wojcicki | G06N 20/00 |
| 2024/0170008 | A1* | 5/2024 | Mosayyebpour Kaskari | G10L 21/0208 |
| 2024/0181201 | A1* | 6/2024 | Philpott | A61B 5/123 |
| 2024/0274120 | A1* | 8/2024 | Dai | G10L 13/02 |
| 2024/0282428 | A1* | 8/2024 | Seth | G16H 50/20 |
| 2024/0314509 | A1* | 9/2024 | Nawfal | H04S 7/30 |
| 2024/0361827 | A1* | 10/2024 | McNulty | G10L 25/63 |
| 2024/0371357 | A1* | 11/2024 | Law | G10L 25/63 |
| 2025/0039501 | A1* | 1/2025 | Shin | G06T 3/4046 |
| 2025/0061886 | A1* | 2/2025 | Yang | G10L 19/167 |
| 2025/0140265 | A1* | 5/2025 | Yu | G10L 19/0017 |
| 2025/0252965 | A1* | 8/2025 | Parnamaa | G10L 15/063 |
| 2025/0279087 | A1* | 9/2025 | Kastner | G10L 17/04 |
| 2025/0279105 | A1* | 9/2025 | Yang | G10L 21/0272 |
| 2025/0292098 | A1* | 9/2025 | Shamir | G06N 3/04 |

OTHER PUBLICATIONS

Vova Ovsiienko, "Audio Super Resolution Turns Low-Quality Voice Samples into High-Quality Materials," Respeecher, Nov. 14, 2023.

Eric Hal Schwartz, "Google is Using AI to Fill in Gaps in Duo Calls," Voicebot.ai, https://voicebot.ai/2020/04/23/google-is-using-ai-to-fill-in-gaps-in-duo-calls/, Nov. 14, 2023.

Santiago Pascual, et al., "SEGAN: Speech Enhancement Generative Adversarial Network," Universitat Politecnica de Catalunya, Barcelona, Spain, Telefonica Research, Barcelona, Spain, https://arxiv.org/abs/1703.09452.

* cited by examiner

DISTRIBUTABLE AI VOICE UPSCALING

FIELD

The subject matter disclosed herein relates to improving audio signals and more particularly relates to improving audio signals using AI voice upscaling models.

BACKGROUND

Poor audio quality negatively impacts voice calls and online meetings. Audio quality can be improved by increasing transmission data rate, but this is cost prohibitive. Alternatively, a static voice upscaling model could improve audio quality. However, this improvement is limited as the model is not trained to the individual voice of each user, making the upscaled audio signal especially susceptible to distortion.

BRIEF SUMMARY

A method for distributable upscaling of audio signals is disclosed. An apparatus and computer program product also perform the functions of the method. The method includes receiving, over a communication channel by an electronic device of a first user, a low quality voice communication from a second user. The method includes accessing an AI voice upscaling model of the second user. The AI voice upscaling model is trained on a voice of the second user. The method includes using the AI voice upscaling model to improve the quality of the low quality voice communication to create a higher quality voice communication of the second user. The method includes transmitting the higher quality voice communication to a speaker connected to the electronic device of the first user.

According to another aspect of the present innovation, a method of distributable upscaling of audio signals includes training an AI voice upscaling model using a voice of a second user located remotely from a first user. The method includes uploading the AI voice upscaling model of the voice of the second user to a computing device accessible to the first user. The method includes initiating a voice communication between an electronic device of the second user and an electronic device of the first user over a communication channel. The electronic device of the first user uses the AI voice upscaling model to create a higher quality voice communication of the second user prior to transmitting the higher quality voice communication to the first user.

According to a third aspect of the present innovation, an apparatus for distributable, real-time upscaling of audio signals includes a processor and non-transitory computer readable storage media storing code. The code is executable by the processor to perform operations that include receiving, over a communication channel by an electronic device of a first user, a low quality voice communication from a second user. The operations include accessing an AI voice upscaling model of the second user. The AI voice upscaling model is trained on a voice of the second user. The operations include using the AI voice upscaling model to improve the quality of the low quality voice communication to create a higher quality voice communication of the second user. The operations include transmitting the higher quality voice communication to a speaker connected to the electronic device of the first user.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
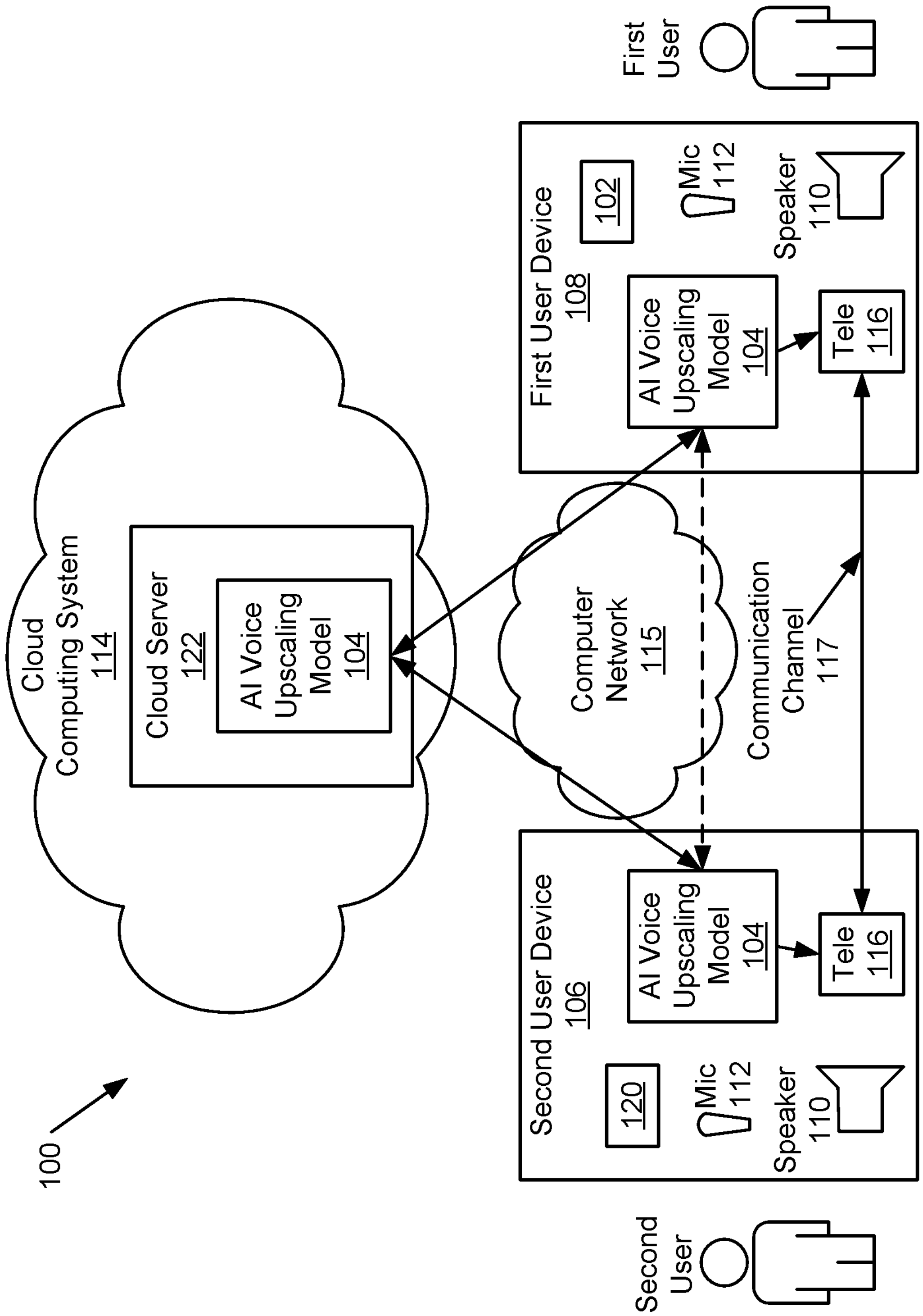
FIG. 1 is a schematic block diagram illustrating a system for distributable upscaling of audio signals, according to various embodiments.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

A method for distributable upscaling of audio signals is disclosed. An apparatus and computer program product also perform the functions of the method. The method includes receiving, over a communication channel by an electronic device of a first user, a low quality voice communication from a second user. The method includes accessing an artificial intelligence ("AI") voice upscaling model of the second user. The AI voice upscaling model is trained on a voice of the second user. The method includes using the AI voice upscaling model to improve the quality of the low quality voice communication to create a higher quality voice communication of the second user. The method includes transmitting the higher quality voice communication to a speaker connected to the electronic device of the first user.

In some embodiments, receiving the low quality voice communication from the second user, accessing the AI voice upscaling model of the second user, using the AI voice upscaling model to improve a quality of the low quality voice communication, and transmitting the higher quality voice communication to a speaker connected to the electronic device of the first user are performed in real-time. In other embodiments, the AI voice upscaling model is trained on the voice of the second user via machine learning during a training period. In the embodiments, the AI voice upscaling model is uploaded to a computing device accessible to the first user. In other embodiments, machine learning is used to continually train the AI voice upscaling model after the training period. In other embodiments, training the AI voice upscaling model and uploading the AI voice upscaling model occur simultaneously.

In some embodiments, the AI voice upscaling model is accessible via a connection to a cloud computing system. In other embodiments, the communication channel is of limited bandwidth such that the low quality voice communication from the second user loses quality while being transmitted to the first user. In other embodiments, the method includes training an AI voice upscaling model on the voice of the first user and uploading the AI voice upscaling model trained on the voice of the first user to a cloud computing system. In other embodiments, accessing the AI voice upscaling model includes downloading the AI voice upscaling model from a cloud computing system and storing the AI voice upscaling model locally on one of the electronic device of the first user and a local electronic device accessible to the electronic device of the first user prior to receiving the low quality voice communication from the second user.

According to another aspect of the present innovation, a method of distributable upscaling of audio signals includes training an AI voice upscaling model using a voice of a second user located remotely from a first user. The method includes uploading the AI voice upscaling model of the voice of the second user to a computing device accessible to the first user. The method includes initiating a voice communication between an electronic device of the second user and an electronic device of the first user over a communication channel. The electronic device of the first user uses the AI voice upscaling model to create a higher quality voice communication of the second user prior to transmitting the higher quality voice communication to the first user.

In some embodiments, uploading the AI voice upscaling model to a computing device accessible to the first user includes uploading the AI voice upscaling model to a cloud computing system. In other embodiments, the method includes training an AI voice upscaling model on the voice of the first user and uploading the AI voice upscaling model trained on the voice of the first user to a cloud computing system.

In some embodiments, during the voice communication, the electronic device of the first user accesses the AI voice upscaling model of the second user and uses the AI voice upscaling model to create the higher quality voice communication and transmits the higher quality voice communication to a speaker connected to the electronic device of the first user in real time. In other embodiments, the AI voice upscaling model is trained on the voice of the second user via machine learning during a training period. In other embodiments, machine learning is used to continually train the AI voice upscaling model on the voice of the second user after the training period. In other embodiments, training the AI voice upscaling model on the voice of the second user and uploading the AI voice upscaling model occur simultaneously. In other embodiments, uploading the AI voice upscaling model to a computing device accessible to the first user includes uploading the AI voice upscaling model to a cloud computing system.

An apparatus for distributable, real-time upscaling of audio signals includes a processor and non-transitory computer readable storage media storing code. The code is executable by the processor to perform operations that include receiving, over a communication channel by an electronic device of a first user, a low quality voice communication from a second user. The operations include accessing an AI voice upscaling model of the second user. The AI voice upscaling model is trained on a voice of the second user. The operations include using the AI voice upscaling model to improve the quality of the low quality voice communication to create a higher quality voice communication of the second user. The operations include transmitting the higher quality voice communication to a speaker connected to the electronic device of the first user.

In some embodiments, receiving the low quality voice communication from the second user, accessing the AI voice upscaling model of the second user, using the AI voice upscaling model to improve a quality of the low quality voice communication, and transmitting the higher quality voice communication to a speaker connected to the electronic device of the first user are performed in real-time. In some embodiments, the AI voice upscaling model is trained on the voice of the second user via machine learning during a training period and is used to continually train the AI voice upscaling model after the training period. In some embodiments, accessing the AI voice upscaling model includes downloading the AI voice upscaling model from a cloud computing system and storing the AI voice upscaling model locally on one of the electronic device of the first user and a local electronic device accessible to the electronic device of the first user prior to the receiving of the low quality voice communication from the second user.

FIG. 1 is a schematic block diagram illustrating a system 100 for distributable upscaling of audio signals, according to various embodiments. The system 100 includes a first user device 108 with an AI voice upscaling apparatus 102, a speaker 110, a microphone 112, and a telecommunications device 116. The first user device 108 is connected to a second user device 106 which likewise includes a speaker 110, a microphone 112, and a telecommunications device 116, and additionally includes a training apparatus 120. In some embodiments, the AI voice upscaling apparatus 102 and the training apparatus 120 are combined and both first user device 108 and the second user device 106 include the combined apparatus, which may be similar to the apparatuses 300, 500 in FIGS. 3 and 5. Both user devices 106, 108 are connected to a cloud server 122 within a cloud computing system 114, and to each other, by a computer network 115. A communication channel 117 runs between the telecommunications devices 116, depicted as "TELE 116," in each of the user devices 106, 108. The user devices 106, 108 and the cloud server all may store or run an AI voice upscaling model 104.

The user devices 106, 108 may include, for example but are not limited to, a desktop, a laptop, a tablet, a wearable device, a mobile device, an IoT device. In some embodiments, the first and second user devices 106, 108 include a computing device capable of running the AI voice upscaling model 104 and communicating with other devices on the computer network 115. In other embodiments, one or both of the first and second user devices 106, 108 connect with a computing device able to run the AI voice upscaling model 104.

The speaker 110 may be of multiple types, configurations, and abilities appropriate to the first and second user devices 106, 108. In some embodiments, the speaker 110 may be located within the first and second user devices 106,108 or be located outside of the user device 106, 108. In various embodiments, the speaker 110 includes an internal or external amplifier. The speaker 110, in some embodiments, may have associated woofers, subwoofers, tweeters, or other drivers that render higher fidelity sound. In some embodiments, the speaker 110 is configured as 2.0 channel speaker system having a left and right channel for sound, a 2.1 channel speaker system having left and right channels for sound and a subwoofer, or any other device-appropriate configuration.

In some embodiments, the first and second user devices 106, 108 each include a microphone 112. In some embodiments, the microphone 112 is of any type compatible with the first and second user devices 106, 108. In some embodiments, the microphone 112 includes, for example, but not limited to a dynamic microphone, a condenser microphone, and a contact microphone. In various embodiments, the microphone 112 is wired or is wireless. The microphone 112, in some embodiments, is directional or omni directional. In various embodiments, the microphone 112 is internal or external to the first and second user devices 106, 108. In some embodiments, the telecommunications device 116 is external to the first user device 108 and the microphone 112 and/or the speaker 110 is part of the telecommunications device 116.

The telecommunications devices 116 are one of any number of voice communication devices capable of transmitting a voice communication between the first user device 108 and the second user device 106. In some embodiments, the telecommunications devices 116 are for example, but not limited to, a voice over internet protocol ("VOIP") enabled phone, a cellular phone, a radio, a broadband modem, a satellite modem. The voice communication travels between the first user device 108 and the second user device 106 in either direction along the communication channel 117. Where the telecommunications devices 116 are external to the first and second user devices 106, 108, in some embodiments the speaker 110 and/or microphone 112 are part of the telecommunications device 116.

In some embodiments, the telecommunication devices 116 are external to the first and second user devices 106, 108 and are connected to the first and second user devices 106, 108 via a wired or wireless connection and the communication channel 117 is between the first and second user devices 106, 108. In the embodiments, the telecommunications devices 116 access the AI voice upscaling model 104 on or through the first and second user devices 106, 108. The communication channel 117, in some embodiments, is a telephone connection through one or more telephone service providers. The communication channel 117 may be a wired or wireless connection capable of transmitting a voice communication. The communication channel 117 may be, but is not limited to a plain old telephone service (POTS) twisted copper line equipped with a modem or other equipment to digitize the transmitted voice communication, an ethernet cable, a fiberoptic cable, a Wi-Fi connection, or a satellite link.

In other embodiments, the communication channel 117 uses a same connection through a computer network 115 as is used between the first and second user devices 106, 108 for data communications. The connections between the first and second user devices 106, 107 through the computer network 115, in various embodiments, include one or more computer networks, such as a LAN, a WAN, a fiber network, a cellular network, a telephone communications, network, a wireless network, etc. or any combination thereof.

In some embodiments, the computer network 115 connects the first user device 108 and the second user device 106 to each other and connects each user device 106,108 to the cloud server 122 within the cloud computing system 114. The computer network 115 includes various devices, such as switches, routers, cabling, servers, and the like. The computer network may include physical connections, including but not limited to a broadband, wireless connections as described further below, or a combination thereof.

The computer network 115 may include a wireless connection that may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

In some embodiments, the cloud computing system 114 provides cloud computing services as products, services, solutions, etc. offered to users in real-time over the internet. In some embodiments, the cloud computing system 114 includes a computing system which offers shared services, available to all authorized users, having a one-to-many relationship. In other embodiments, the cloud computing system 114 hosts applications for users on virtual machines or containers. In such a systems, users may install and use their own applications.

In some embodiments, the cloud computing system 114 relies on the Internet or connectivity via the same Internet protocols used for dedicated lines. The cloud computing system may include cloud computing nodes (e.g., cloud servers 122, discussed below) which provide cloud computing services, cloud computing networks, user interfaces, one or more external networks through which user devices 106, 108 may be connected to one or more cloud servers 122, as well as monitoring components and management components.

In some embodiments, the cloud server 122 is a server in the cloud computing system 114 hosting the AI voice upscaling model 104. In various embodiments, the cloud server 122 is a computing system or data processing system configured with software programs including operating systems and applications providing cloud computing services. The cloud server 122, in some embodiments, includes data storage systems included within the cloud server 122 or externally attached to one or more cloud servers 122, e.g., via a storge area network ("SAN"). In some embodiments, users access cloud services through interfaces at the cloud computing system 114. An interface may be a protocol that runs on certain hardware. Various interfaces are contemplated. For example, a cloud server 122 which provides a web server service for a web services interface may be based on Ethernet and TCP/IP. Typically, users access cloud computing services or applications through a web browser or other application via an application program interface ("API").

In some embodiments, the AI voice upscaling model 104 is a cloud computing service offered by the cloud computing system 114. The AI voice upscaling model 104, in some embodiments, may take the form of a software application stored within memory of the cloud server 122. In some embodiments, users may access, download, update, and upload all or a portion of the AI voice upscaling model 104 via the first user device 108 or the second user device 106. The AI voice upscaling model 104, in some embodiments, is a trainable model. The AI voice upscaling model 104, in some embodiments, is operative to improve or upscale the sound quality of low quality audio signals. In some examples, the AI voice upscaling model 104 is used to upscale a voice communication of poor quality received from a subject.

In some embodiments, the AI voice upscaling model 104 includes machine learning that uses classical machine learning along with the voice of the second user, voice recordings of the second user, etc. during supervised learning to inform the machine learning algorithms of the AI voice upscaling model 104. In other embodiments, the machine learning uses neural networks and/or deep learning to use datasets regarding the voice of the second user that are not labeled to automatically determine a set of features which distinguish different categories of data from one another and eliminates some human intervention. The neural networks, in some embodiments, include node layers with an input layer, one or more hidden layers, and an output layer. In some embodiments, the input layer of the neural network of the machine learning includes input from the second user device 106, telecommunication device 116, and/or other applicable data sources. In some embodiments, the hidden layers are deep learning and are two or more layers deep. The AI voice upscaling model 104 trains on the second user's voice during a training period. In some embodiments, the AI voice upscaling model 104 trains on subsequent voice input from the second user to update the AI voice upscaling model 104.

The AI voice upscaling model 104 is trained on the voice of a subject to create a voice model. The AI voice upscaling model 104 may be trained, for instance, using a real-time voice communication, a voice recording from any number of sources. Such a signal may be of poor quality due to, for example, line loss, compression, reverberation, or noise. The voice model can then be used to correct a poor quality voice communication received from the subject by predicting what the poor quality signal should have sounded like. In some embodiments, the process of training is iterative allowing for the voice model to be continually updated as new audio from the subject is received. The training process and upscaling process are explained further in the description of the AI voice scaling apparatus 102 and the training apparatus 120.

Figure 2:
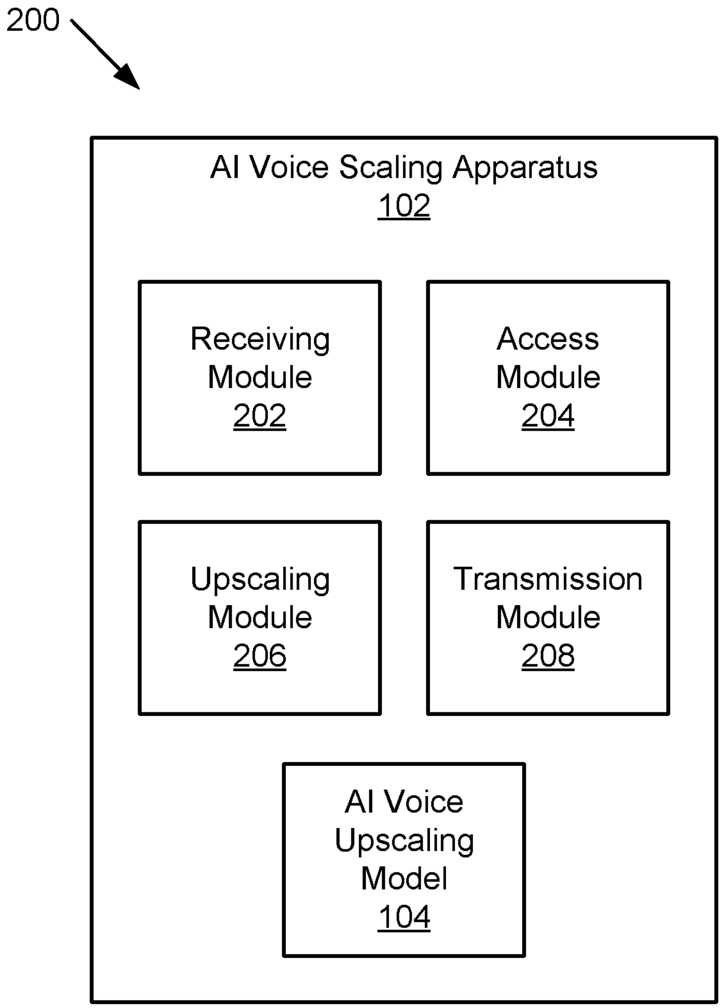
FIG. 2 is a schematic block diagram illustrating an apparatus for distributable upscaling of audio signals, according to various embodiments.

FIG. 2 is a schematic block diagram illustrating an apparatus 200 for distributable upscaling of audio signals, according to various embodiments. The apparatus 200 includes an AI voice scaling apparatus 102 with a receiving module 202, an access module 204, an upscaling module 206, a transmission module 208, and an AI voice upscaling model 104. In some embodiments, the apparatus 200 is implemented using executable code stored on computer readable storage media, which is non-transitory. In other embodiments, all or a portion of the apparatus 200 is implemented using a programmable hardware device and/or hardware circuits.

The apparatus 200 includes a receiving module 202 configured to receive over communication channel by an electronic device of a first user (e.g., the first user device 108), a low quality voice communication from a second user. In some embodiments, the communication channel is the communication channel 117. In some embodiments, the low quality voice communication is part of a bidirectional conversation between the first user and the second user. In some embodiments, the first user initiates voice communication with the second user. In other embodiments, the second user initiates voice communication with the first user. In other embodiments, the low quality voice communication is a voice message to the first user, such as a voice mail, an audio portion of a video, or other media signal that includes voice communication.

The receiving module 202 is part of a telecommunication device 116 that may be any hardware device capable of receiving the low quality voice communication, including but limited to a cell phone, a tablet computer, a laptop computer, a desktop computer, a telephone capable of VOIP, a transceiver, a modem, or the like. In some embodiments, the receiving module 202 receives the low quality voice transmission from the second user device 106 in real time. In other embodiments, the communication channel 117 is of limited bandwidth such that the low quality voice communication from the second user loses quality while being transmitted to the first user. The communication channel 117 may be any wired or wireless communication link suitable for carrying the voice transmission, including but not limited to POTS copper wire, Wi-Fi, Ethernet, or the like as described above.

The apparatus 200 includes an access module 204, configured to access an AI voice upscaling model 104 of the second user, where the AI voice upscaling model 104 is trained on the voice of the second user. In some embodiments, the AI voice upscaling model 104 is trained from voice communications of the second user at one or more second user devices 106. In other embodiments, all or a portion of the AI voice upscaling model 104 is located in a cloud computing system 114 accessible to the first user device 108 and the access module 204 accesses the AI voice upscaling model 104 from the cloud computing system 114. In some embodiments, the access module 204 accesses the AI voice upscaling model 104 of the first user device 108 in real time. In other embodiments, the access module 204 accesses the AI voice upscaling model 104 by downloading the AI voice upscaling model 104 from a cloud computing system 114 and then storing the AI voice upscaling model 104 locally on one of the electronic device of the first user (e.g., first user device 108) and a local electronic device accessible to the first user device 108 prior to receiving the low quality voice communication from the second user.

The apparatus 200 includes an upscaling module 206, configured to use the AI voice upscaling model 104 to improve a quality of the low quality voice communication to create a higher quality voice communication of the second user. As used herein, upscaling uses deep learning, machine learning, a neural network, or the like to convert a lower-resolution media to a higher resolution media. Voice upscaling uses deep learning, machine learning, a neural network, or the like to convert a lower-resolution a low quality voice communication to a higher quality voice communication. In some embodiments, the upscaling module 206 uses the AI voice upscaling model 104 to improve a quality of the low quality voice communication in real-time. The upscaling module 206 may be implemented using oversampling/upscaling logic.

In some examples, if the low quality voice communication is received in analog form and the upscaling module 206 includes or accesses an analog-to-digital converter to create a digital version of the low quality voice communication and the AI voice upscaling model 104 uses the digital version of the low quality voice communication of the second user to create the higher quality voice communication of the second user. In some embodiments, the upscaling module 206 uses the AI voice upscaling model 104 with an analog version of the low quality communication of the second user. In other embodiments, the upscaling module 206 includes other elements used in converting the low quality voice communication to a signal suitable for use with the AI voice upscaling model 104, such as an amplifier, a low pass filter, or the like. In some embodiments, the upscaling module 206 converts a higher quality voice communication to an analog signal that is higher quality than a received analog low quality voice communication. In other embodiments, the low quality voice communication is received by the receiving module 202 as a digital signal. The parameters of the logic elements could vary as required to optimize the improved signal output by the upscaling module 206. Alternative or additional logic components or methodologies used to implement the upscaling module 206 are contemplated herein.

The apparatus 200 includes a transmission module 208 configured to transmit the higher quality voice communication output by the upscaling module 206 to a speaker 110 connected to the electronic device of the first user (e.g., first user device 108). The transmission module 208, in some embodiments, includes any hardware device for transmission of the higher quality voice communication output by the upscaling module 206 within the first user device 108. In some examples, the transmission module 208 transmits the higher quality voice communication as an input to sound processing equipment, an amplifier, or the like, which ultimately transmits the higher quality voice communication to the speaker 110. In other embodiments, the transmission module 208 includes hardware, amplifiers, digital processing equipment, and the like to process the higher quality voice communication to the speaker 110. In some embodiments, the transmission module 208 transmits the higher quality voice communication to a speaker 110 connected to the first user device 108 in real-time.

The apparatus 200 is described above where a low quality voice communication of the second user is transmitted from the second user to first user device 108 via a first user device 106 or telecommunication device 116 of the first user. The AI voice upscaling model 104 is trained on the voice of the second user, and an AI voice scaling apparatus 102 located within the first user device 108 acts to upscale the low quality voice communication. Alternative embodiments allow for a low quality voice communication of the first user to be transmitted from the first user device 108 to second user device 106. In the embodiments, the AI voice upscaling model 104 is trained on the voice of the first user, and an AI voice scaling apparatus 102 located within the second user device acts to upscale the low quality voice communication of the first user before transmission to a speaker 110 connected to the second user device 106.

Figure 3:
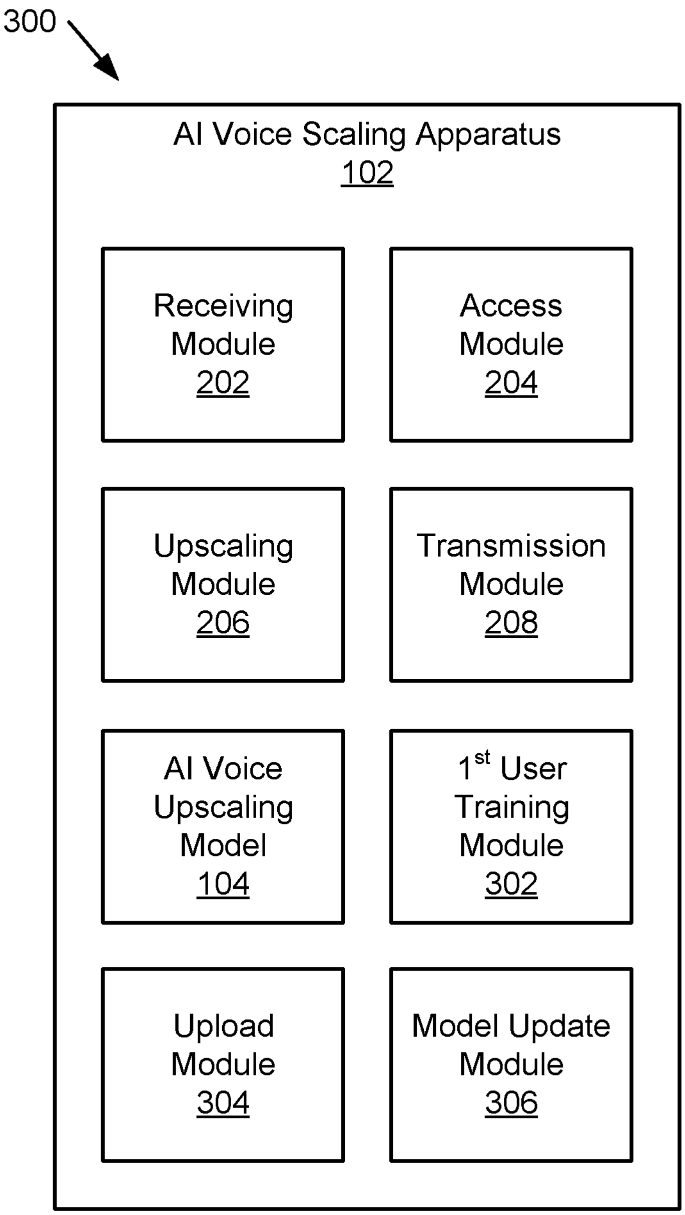
FIG. 3 is a schematic block diagram illustrating another apparatus for distributable upscaling of audio signals, according to various embodiments.

FIG. 3 is a schematic block diagram illustrating another apparatus 300 for distributable upscaling of audio signals, according to various embodiments. The apparatus 300 includes another AI voice scaling apparatus 102 with a receiving module 202, an access module 204, an upscaling module 206, a transmission module 208, and an AI voice upscaling model 104, which are substantially similar to those described above in relation to the apparatus 200 of FIG. 2. The apparatus 300, in various embodiments, includes a first user training module 302, an upload module 304, and a model update module 306, which are described below. In some embodiments, the apparatus 300 is implemented using executable code stored on computer readable storage media. In other embodiments, all or a portion of the apparatus 300 is implemented using a programmable hardware device and/or hardware circuits.

In some embodiments, the apparatus 300 includes a first user training module 302 configured to train the AI voice upscaling model 104 on the voice of the first user. The apparatus 200 is described above wherein a low quality voice communication of the second user is transmitted from the second user device 106 to first user device 108, the AI voice upscaling model 104 is trained on the voice of the second user, and an AI voice scaling apparatus 102 located within the first user device 108 acts to upscale the low quality voice communication. In this alternative embodiment, a low quality voice communication of the first user is transmitted from the first user device 108 to the second user device 106, the AI voice upscaling model 104 is trained on the voice of the first user, and an AI voice scaling apparatus 102 located within the second user device 106 acts to upscale the low quality voice communication.

In some embodiments, the first user training module 302 trains on the voice of the first user during various voice communications, such as with the second user or with other users. In other embodiments, the first user training module 302 trains on the voice of the first user based on voice recordings, voice memos, and the like. In some embodiments, the first user training module 302 trains on the voice of the first user while the AI upscaling model is upscaling low quality voice communications from the second user during a phone call, conference call, online meeting, etc. between the first user and the second user, which may be in real time. In some embodiments the first user training module 302 trains the AI voice upscaling model 104 on the voice of the first user via machine learning during an initial training period.

In some embodiments, the apparatus 300 includes an upload module 304 configured to upload the AI voice upscaling model 104 trained on the voice of the first user to a cloud computing system 114. In some embodiments, the cloud computing system 114 is accessible is accessible to the second user device 106 to be used for improving quality of low quality voice communications from the first user to the second user. In some embodiments, the upload module 304 uploads the AI voice upscaling model 104 following the initial training period in which the AI voice upscaling model 104 is first trained with the voice of the first user. In other embodiments, the upload module 304 uploads the AI voice upscaling model 104 trained on the voice of the first user to a device accessible to the second user, such as the second user device 106. In some embodiments, the device accessible to the second user may include, but is not limited to, the cloud server 122, memory within the second user device 106, a computing device at the location of the second user, or the like. In some embodiments, the first user training module 302 training the AI voice upscaling model 104 with the voice of the first user and uploading, using the upload module 304, the AI voice upscaling model 104 to a computing device accessible to the second user device 106 occur simultaneously, continuously, or at least on an ongoing basis.

The apparatus 300 includes a model update module 306 configured to continually update the AI voice upscaling model 104 after the initial training period. The model update module 306, in some embodiments, trains the AI voice upscaling model 104 with real-time voice data from a concurrent voice transmission by the first user. Additionally, the AI voice upscaling model 104 may be trained with first user's voice data provided by an AI engine sourced by a neural network. Other sources of first user voice data include compressed voice recordings saved locally or at the cloud computing system 114. The model update module 306, in some embodiments, uploads an updated AI voice upscaling model 104 to the cloud server 122 or other device accessible to the second user after each update. Alternatively, the AI voice upscaling model 104 may be continually trained on the voice of the second user and similarly updated.

Figure 4:
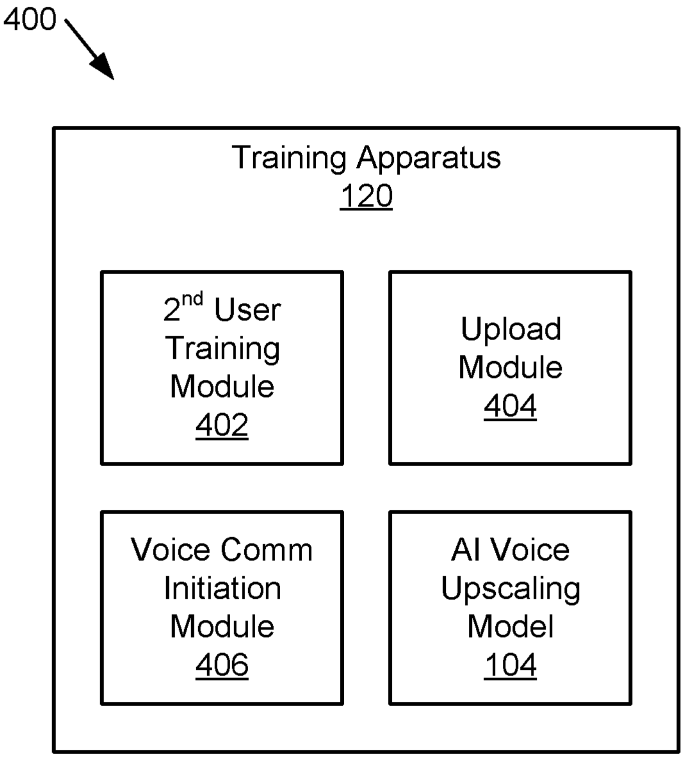
FIG. 4 is a schematic block diagram illustrating an apparatus for training a distributable model upscaling of audio signals, according to various embodiments.

The FIG. 4 is a is a schematic block diagram illustrating an apparatus 400 for training a distributable model upscaling of audio signals, according to various embodiments. The apparatus 400 includes a training apparatus 120. The training apparatus 120 includes a second user training module 402, an upload module 404, a voice communication initiation module 406, and an AI voice upscaling model 104. In some embodiments, the apparatus 400 is implemented using executable code stored on computer readable storage media. In other embodiments, all or a portion of the apparatus 400 is implemented using a programmable hardware device and/or hardware circuits.

In some embodiments, the training apparatus 120 includes a second user training module 402 configured to train the AI voice upscaling model 104 on the voice of the second user. In some embodiments the second user training module 402 trains the AI voice upscaling model 104 on the voice of the second user via machine learning during an initial training period. The during the training period, in some embodiments, the AI voice upscaling model 104 is trained with real-time voice data from a concurrent voice transmission by the second user. Additionally, the AI voice upscaling model 104 may be trained with second user voice data provided by an AI engine sourced by a neural network. Other sources of second user voice data that serve sources of training data during the training period, include compressed voice recordings saved locally or at the cloud computing system 114. In some embodiments, the second user training module 402 trains the AI voice upscaling model 104 similar to how the first user training module 302 trains on the voice of the first user. In some embodiments, the first user training module 302 and the second user training module 402 operate substantially similar except on different voices.

In some embodiments, the training apparatus 120 includes an upload module 404 configured to upload the AI voice upscaling model 104 to a computing device accessible to the first user. In some embodiments, the cloud computing system 114 is accessible is accessible to the first user device 108 to be used for improving quality of low quality voice communications from the second user to the first user. In some embodiments, the upload module 404 is configured to upload the AI voice upscaling model 104 to a computing device accessible to the first user device 108 following the initial training period in which the AI voice upscaling model 104 is first trained with the voice of the second user. A device accessible to the first user device 108 may include, but is not limited to, the cloud server 122, memory within the first user device 108, a computing device at the location of the first user, or the like. In some embodiments, the second user training module 402 training the AI voice upscaling model 104 with the voice of the second user by the second user training module 402 and the upload module 404 uploading the AI voice upscaling model 104 to a computing device accessible to the first user device 108 occur simultaneously, continuously, or on an ongoing basis. In some embodiments, the upload module 304 and the upload module 404 function substantially similar.

In some embodiments, the training apparatus includes a voice communication initiation module 406 configured to initiate a voice communication between an electronic device of the second user and an electronic device of the first user over a communication channel 117. In some embodiments, the voice communication initiation module 406 sends the low quality voice transmission of the voice of the second user, via the second user device 106 to the first user device 108 over the communication channel 117. In other embodiments, the voice communication initiation module 406 sends the low quality voice transmission of the voice of the second user, via a device connected to the second user device 106. In some embodiments, the voice communication initiation module 406 is part of a telecommunication device 116 that may be any hardware device operative to transmit a voice communication from the second user device 106 to the first user device 108, including, but not limited a cell phone, a tablet computer, a laptop computer, a desktop computer, a telephone capable of VOIP, a modem, a transceiver, or the like.

The voice transmission travels along the communication channel 117. The communication channel 117 may be any wired or wireless communication link suitable for carrying the voice transmission, including but not limited to POTS copper wire, Wi-Fi, Ethernet, as described above with regard to the system 100 of FIG. 1. In some embodiments, the first user device 108 includes a voice communication initiation module (not shown) for the first user to initiate a voice communication with the second user. In some embodiments, either the first user or the second user initiates a voice communication via a telecommunication device 116, an online meeting, a conference call application, or the like.

Figure 5:
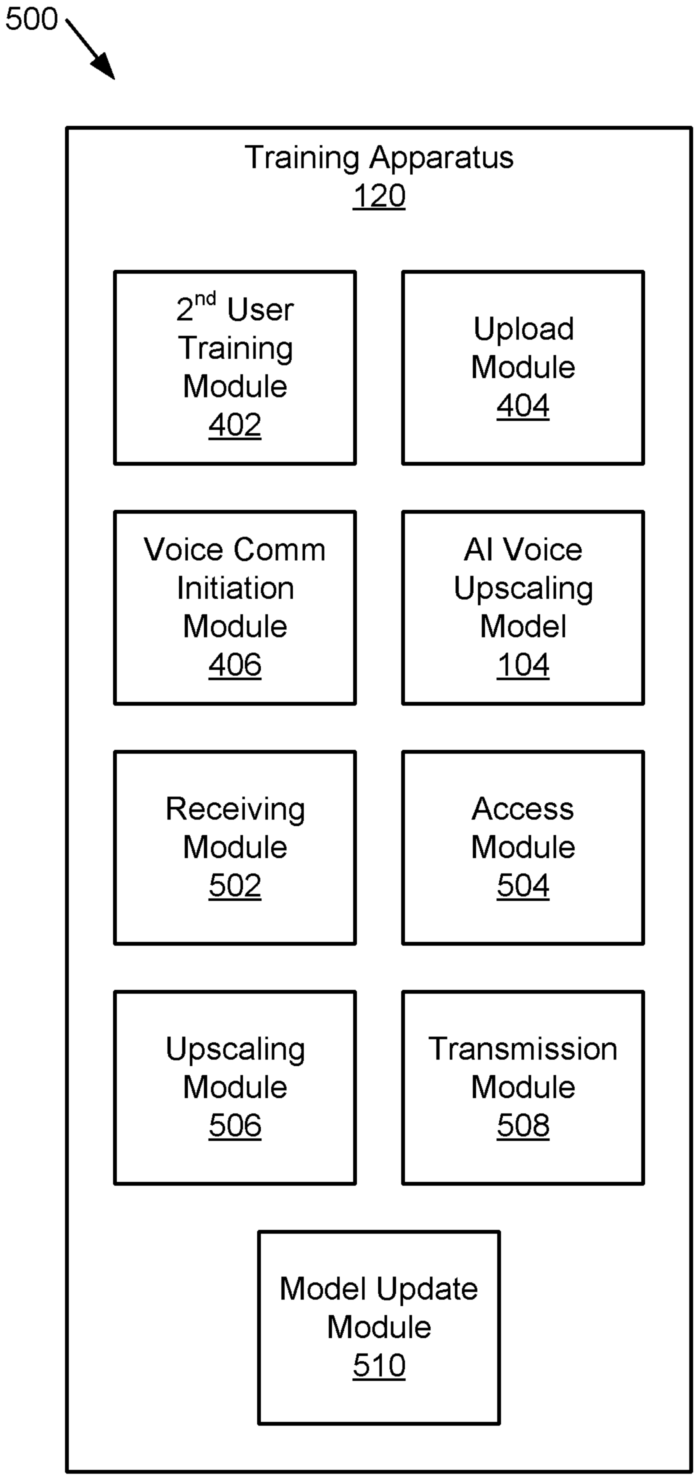
FIG. 5 is a schematic block diagram illustrating another apparatus for training a distributable model upscaling of audio signals, according to various embodiments.

FIG. 5 is a schematic block diagram illustrating another apparatus 500 for training a distributable model upscaling of audio signals, according to various embodiments. The apparatus 500 includes another version of the training apparatus 120 which includes a second user training module 402, an upload module 404, a voice communication initiation module 406, and an AI voice upscaling model 104 which are substantially similar to those described above in relation to the apparatus 400 of FIG. 4. In some embodiments, the training apparatus 120 includes a receiving module 502, an access module 504, an upscaling module 506, a transmission module 508, and/or a model update module 510, which are described below. In various embodiments, the apparatus 500 is implemented similar to the apparatuses 200, 300, 400 of FIGS. 2-4.

In some embodiments, the apparatus 500 includes a receiving module 502, an access module 504, an upscaling module 506, a transmission module 508, and/or a model update module 510 which are substantially similar to the receiving module 202, the access module 204, the upscaling module 208, the transmission module 208, and/or the model update module 306 except operate at the second user device 106 to receive, over a communication channel 117, a low quality voice communication from the first user, accessing the AI voice upscaling model 104 trained on the voice of the first user and upscaling a low quality voice communication of the first user to a higher quality voice communication, transmitting the higher quality voice communication to a speaker 110 at the second user device 106, telecommunication device 116 at the second user, etc., and to update the AI voice upscaling model 104 based on the voice of the second user simultaneously, continuously, or at least on an ongoing basis. In such embodiments, the AI voice apparatus 102 of FIG. 3 may be the same or similar to the training apparatus 120 of FIG. 5.

In some embodiments, both the first user device 106 and the second user device 108 include an AI voice scaling apparatus 300 or a training apparatus 500 that includes the modules 202/502, 204/504, 206/506, 208/508, 302/402, 304/404, 306/510, 406 and at least access to an AI voice upscaling model 104 for bidirectional communication and voice upscaling. One of skill in the art will recognize other ways to implement the modules described herein to employ a distributed voice upscaling model at various user's devices to improve voice communications.

Figure 6:
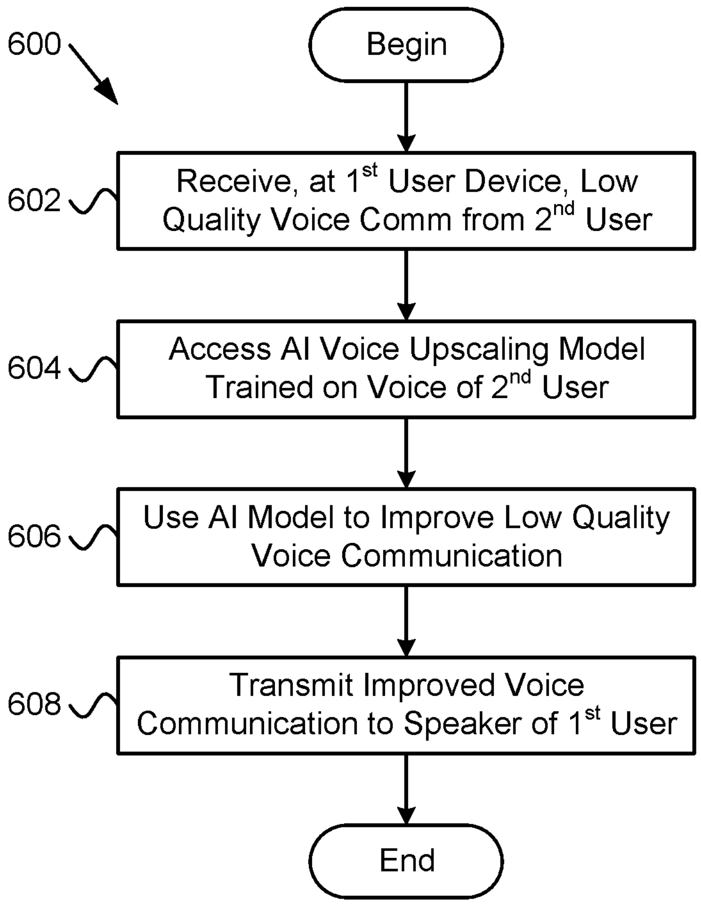
FIG. 6 is a schematic flow chart diagram illustrating a method for distributable upscaling of audio signals, according to various embodiments.

FIG. 6 is a schematic flow chart diagram illustrating a method 600 for distributable upscaling of audio signals, according to various embodiments. The method 600 begins and receives 602 over a communication channel 117 by an electronic device of a first user (e.g., the first user device 108) a low quality voice communication from a second user and accesses 604 an AI voice upscaling model 104 trained on a voice of a second user. The method 600 uses 606 the AI voice upscaling model 104 to improve a quality of the low quality voice communication to create a higher quality voice communication of the second user, and transmits 608 the higher quality voice communication to a speaker 110 connected to the electronic device of the first user (e.g., first user device 108), and the method 600 ends In various embodiments, the method 600 is implemented using all or a portion of the receiving module 202, the access module 204, the upscaling module 206, the transmission module 208, and/or the AI voice upscaling model 104.

In some embodiments, receiving 602 the low quality voice communication from the second user, accessing 604 the AI voice upscaling model of the second user, using 606 the AI voice upscaling model to improve a quality of the low quality voice communication, and transmitting 608 the higher quality voice communication to a speaker 110 connected to the electronic device of the first user are performed in real-time.

In some embodiments, the AI voice upscaling model 104 is uploaded to a computing device accessible to the first user. In other embodiments, the AI voice upscaling model 104 is trained on the voice of the second user via machine learning during a training period. In some embodiments, machine learning is used to continually train the AI voice upscaling model 104 after the training period. In some embodiments, training the AI voice upscaling model 104 and uploading the AI voice upscaling model 104 occur simultaneously.

Figure 7:
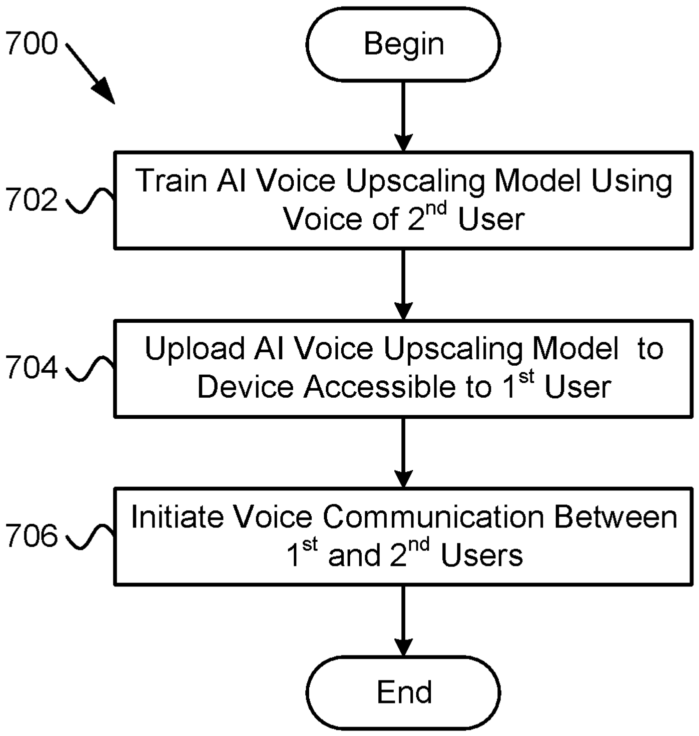
FIG. 7 is a schematic flow chart diagram illustrating a method for training a distributable upscaling model of audio signals, according to various embodiments.

FIG. 7 is a schematic flow chart diagram illustrating a method 700 for training a distributable upscaling model of audio signals, according to various embodiments. The method 700 begins and trains 702 an AI voice upscaling model 104 using a voice of a second user located remotely from a first user and uploads 704 the AI voice upscaling model 104 of the voice of the second user to a computing device accessible to the first user. The method 700 initiates 706 a voice communication between an electronic device of the second user and an electronic device of the first user over a communication channel 117, and the method 700 ends. The electronic device of the first user (e.g., 108) uses the AI voice upscaling model 104 to create a higher quality voice communication of the second user prior to transmitting the higher quality voice communication to the first user. In some embodiments, the method 700 is implemented using all or a portion of the second user training module 402, the upload module 404, the voice communication initiation module 406, and/or the AI voice upscaling model 104.

Figure 8:
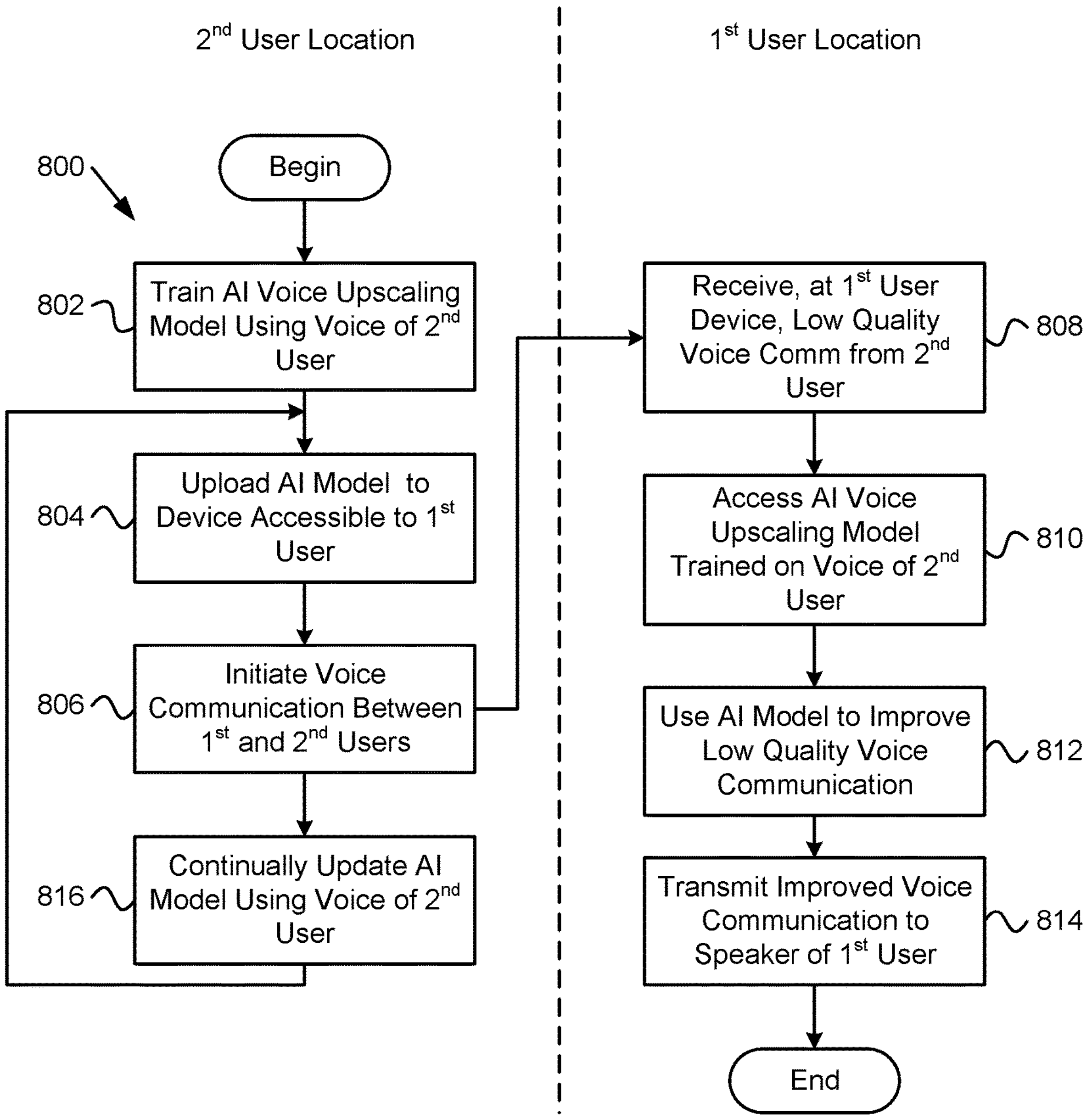
FIG. 8 is a schematic block diagram illustrating a system flowchart for a method for distributable upscaling of audio signals, according to various embodiments.

FIG. 8 is a schematic flowchart illustrating a system flowchart for a method 800 for distributable upscaling of audio signals, according to various embodiments. The method 800 begins, trains 802, at a location of a second user, an AI voice upscaling model 104 with the voice of a second user, uploads 804 the trained AI voice upscaling model 104 to a computing device accessible by the first user, for example the first user device 108, and initiates 806 a voice communication from an electronic device of the second user, for example, the second user device 106, to an electronic device of the first user (e.g. 108) user over a communication channel 117. Alternatively, the first user initiates a voice communication between the first and second users.

The method 800, at the first user location, receives 808 over the communication channel 117 by an electronic device of a first user, a low quality voice communication from the second user. The method 800 accesses 810 an AI voice upscaling model 104 trained on the voice of the second user. The method 800 uses 812 the AI voice upscaling model 104 to improve the quality of the low quality voice communication to create a higher quality voice communication of the second user. The method 800 transmits 814 the higher quality voice communication to a speaker 110 connected to the electronic device of the first user (e.g., 108), and the method 800 ends. The method 800, at the first user location, also continually updates 816 the AI voice upscaling model 104 using the voice of the second user. In various embodiments, all or a portion of the method 800 is implemented using the AI voice upscaling model 104, the receiving module 202, the access module 204, the upscaling module 206, the transmission module 208, the second user training module 402, the upload module 404, the voice communication initiation module 406, and/or the model update module 504.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving, over a communication channel by an electronic device of a first user, a low quality voice communication from a second user;

accessing an artificial intelligence ("AI") voice upscaling model of the second user, the AI voice upscaling model trained on a voice of the second user;

using the AI voice upscaling model to improve a quality of the low quality voice communication to create a higher quality voice communication of the second user; and transmitting the higher quality voice communication to a speaker connected to the electronic device of the first user, wherein accessing the AI voice upscaling model includes downloading the AI voice upscaling model from a cloud computing system and storing the AI voice upscaling model locally on one of the electronic device of the first user and a local electronic device accessible to the electronic device of the first user prior to receiving the low quality voice communication from the second user.

2. The method of claim 1, wherein receiving the low quality voice communication from the second user, accessing the AI voice upscaling model of the second user, using the AI voice upscaling model to improve a quality of the low quality voice communication, and transmitting the higher quality voice communication to a speaker connected to the electronic device of the first user are performed in real-time.

3. The method of claim 1, wherein the AI voice upscaling model is trained on the voice of the second user via machine learning during a training period, and wherein the AI voice upscaling model is uploaded to a computing device accessible to the first user.

4. The method of claim 3, wherein machine learning is used to continually train the AI voice upscaling model after the training period.

5. The method of claim 3, wherein training the AI voice upscaling model and uploading the AI voice upscaling model occur simultaneously.

6. The method of claim 1, wherein the AI voice upscaling model is accessible via a connection to a cloud computing system.

7. The method of claim 1, wherein the communication channel is of limited bandwidth such that the low quality voice communication from the second user loses quality while being transmitted to the first user.

8. The method of claim 1, further comprising:

training an AI voice upscaling model on the voice of the first user; and uploading the AI voice upscaling model trained on the voice of the first user to a cloud computing system.

9. A method comprising:

training an artificial intelligence ("AI") voice upscaling model using a voice of a second user located remotely from a first user;

uploading the AI voice upscaling model of the voice of the second user to a computing device accessible to the first user; and initiating a voice communication between an electronic device of the second user and an electronic device of the first user over a communication channel, wherein the electronic device of the first user uses the AI voice upscaling model to create a higher quality voice communication of the second user prior to transmitting the higher quality voice communication to the first user, wherein accessing the AI voice upscaling model includes downloading the AI voice upscaling model from a cloud computing system and storing the AI voice upscaling model locally on one of the electronic device of the first user and a local electronic device accessible to the electronic device of the first user prior to receiving a low quality voice communication from the second user.

10. The method of claim 9, wherein, during the voice communication, the electronic device of the first user accesses the AI voice upscaling model of the second user and uses the AI voice upscaling model to create the higher quality voice communication and transmits the higher quality voice communication to a speaker connected to the electronic device of the first user in real time.

11. The method of claim 9, wherein the AI voice upscaling model is trained on the voice of the second user via machine learning during a training period.

12. The method of claim 11, wherein machine learning is used to continually train the AI voice upscaling model on the voice of the second user after the training period.

13. The method of claim 11, wherein training the AI voice upscaling model on the voice of the second user and uploading the AI voice upscaling model occur simultaneously.

14. The method of claim 9, wherein uploading the AI voice upscaling model to a computing device accessible to the first user comprises uploading the AI voice upscaling model to a cloud computing system.

15. The method of claim 9, further comprising:

training an AI voice upscaling model on the voice of the first user; and uploading the AI voice upscaling model trained on the voice of the first user to a cloud computing system.

16. An apparatus comprising:

a processor; and non-transitory computer readable storage media storing code, the code being executable by the processor to perform operations comprising:

receiving, over a communication channel by an electronic device of a first user, a low quality voice communication from a second user;

accessing an artificial intelligence ("AI") voice upscaling model of the second user, the AI voice upscaling model trained on a voice of the second user;

using the AI voice upscaling model to improve a quality of the low quality voice communication to create a higher quality voice communication of the second user; and transmitting the higher quality voice communication to a speaker connected to the electronic device of the first user, wherein accessing the AI voice upscaling model includes downloading the AI voice upscaling model from a cloud computing system and storing the AI voice upscaling model locally on one of the electronic device of the first user and a local electronic device accessible to the electronic device of the first user prior to receiving the low quality voice communication from the second user.

17. The apparatus of claim 16, wherein receiving the low quality voice communication from the second user, accessing the AI voice upscaling model of the second user, using the AI voice upscaling model to improve a quality of the low quality voice communication, and transmitting the higher quality voice communication to a speaker connected to the electronic device of the first user are performed in real-time.

18. The apparatus of claim 16, wherein the AI voice upscaling model is trained on the voice of the second user via machine learning during a training period and is used to continually train the AI voice upscaling model after the training period.

* * * * *